US011499528B2

(12) United States Patent
Ventura Garcia et al.

(10) Patent No.: US 11,499,528 B2
(45) Date of Patent: Nov. 15, 2022

(54) WIND TURBINE MAST SECTION, WIND TURBINE MAST AND ASSEMBLY METHOD

(71) Applicant: ArcelorMittal, Luxembourg (LU)

(72) Inventors: Beatriz Ventura Garcia, Liège (BE); Elena Di Silvestro, Sprimont (BE); Emilie Dupont, Mont-Saint-Hilaire (CA)

(73) Assignee: ARCELORMITTAL, Luxembourg (LU)

( * ) Notice: Subject to any disclaimer, the term of this patent is extended or adjusted under 35 U.S.C. 154(b) by 297 days.

(21) Appl. No.: 16/627,461

(22) PCT Filed: Jun. 30, 2017

(86) PCT No.: PCT/IB2017/053968
§ 371 (c)(1),
(2) Date: Dec. 30, 2019

(87) PCT Pub. No.: WO2019/002921
PCT Pub. Date: Jan. 3, 2019

(65) Prior Publication Data
US 2021/0115903 A1  Apr. 22, 2021

(51) Int. Cl.
*F03D 13/20* (2016.01)
(52) U.S. Cl.
CPC .......... *F03D 13/20* (2016.05); *F05B 2230/60* (2013.01)
(58) Field of Classification Search
CPC ...... F03D 13/10; F03D 13/20; F05B 2230/60; F05B 2260/30–301
See application file for complete search history.

(56) References Cited

U.S. PATENT DOCUMENTS

| 8,250,833 B2 * | 8/2012 | Thomsen | E04H 12/085 |
| | | | 52/845 |
| 8,713,896 B2 * | 5/2014 | Willis | F03D 13/10 |
| | | | 52/848 |

(Continued)

FOREIGN PATENT DOCUMENTS

| CN | 205669338 U | * | 11/2016 |
| CN | 205669338 U | | 11/2016 |

(Continued)

OTHER PUBLICATIONS

Corresponding Search Report for International Application No. PCT/IB2017/053968.

*Primary Examiner* — Brian P Wolcott
(74) *Attorney, Agent, or Firm* — Davidson, Davidson & Kappel, LLC (57) ABSTRACT

A mast section (1) for a wind turbine having a longitudinal central axis (L) extending along a longitudinal direction includes at least two tubular mast elements (14) stacked along the longitudinal direction and arranged edge-to-edge at a joining plane (P). Each mast element (14) includes at least two wall segments (16), connected to one another by segment connectors (26) extending along longitudinal edges of the wall segments (16). The mast section (1) further includes element connectors (37) each extending astride the two mast elements (14), in the extension of the segment connectors (26) in the longitudinal direction. The mast section (1) further includes a plurality of element overconnectors (45), each element overconnector (45) extending astride a segment connector (26) and an adjacent element connector (37) in the longitudinal direction.

24 Claims, 6 Drawing Sheets

(56) References Cited

U.S. PATENT DOCUMENTS

| | | | |
|---|---|---|---|
| 10,041,269 B2 * | 8/2018 | Gremling | F03D 13/20 |
| 2009/0021019 A1 | 1/2009 | Thomsen | |
| 2010/0313497 A1 | 12/2010 | Jensen | |
| 2011/0283652 A1 * | 11/2011 | Haridasu | F03D 80/70 |
| | | | 52/651.01 |

FOREIGN PATENT DOCUMENTS

| | | | |
|---|---|---|---|
| KR | 20150114073 A | * | 10/2015 |
| KR | 20150114073 A | | 10/2015 |
| WO | WO2016156925 A1 | | 10/2016 |

* cited by examiner

WIND TURBINE MAST SECTION, WIND TURBINE MAST AND ASSEMBLY METHOD

The present invention relates to a mast section for a wind turbine, a wind turbine mast comprising such a section, as well as a method for assembling a mast section for a wind turbine.

BACKGROUND

Efforts to improve the energy efficiency of wind turbines have led, over time, to an increased size of the turbines, requiring masts with an increased height and diameter to support them. Due to their large dimensions, such masts cannot be transported assembled. Consequently, the masts are generally transported in portions to their installation site, before being assembled in situ.

More particularly, methods exist for assembling wind turbine masts, according to which wall segments of the wind turbine are transported to the installation site of the wind turbine, then these wall segments are assembled using segment connectors to form substantially tubular, generally cylindrical or frustoconical, mast elements which are next successively assembled to one another using element connectors to form the wind turbine mast.

SUMMARY

In light of the increasingly large dimensions of wind turbines, it is necessary to improve the mechanical strength of these masts so as to minimize the risk of failure during use, in particular by buckling, while limiting the production costs and the assembly time as much as possible.

One aim of the invention is to provide a wind turbine mast, possibly of great dimensions, having an increased lifetime and able to be transported easily and quickly and assembled at a lower cost.

A mast section for a wind turbine is provided having a longitudinal central axis extending along the longitudinal direction, the mast section comprising at least two tubular mast elements stacked along the longitudinal direction and arranged edge-to-edge at a joining plane, each mast element comprising at least two wall segments, connected to one another by segment connectors extending along the longitudinal edges of the wall segments, the mast section further comprising element connectors each extending astride said two mast elements, in the extension of the segment connectors in the longitudinal direction, the mast section further comprising a plurality of element overconnectors, each element overconnector extending astride a segment connector and an adjacent element connector in the longitudinal direction.

According to specific embodiments, the mast section includes one or more of the following features, considered alone or according to any technically possible combination(s):

- each element overconnector has a symmetrical outer contour relative to a horizontal plane passing, in the longitudinal direction, midway between the segment connector and the element connector;
- the longitudinal edges of the element overconnector coincide with the longitudinal edges of the underlying segment connector;
- each element overconnector is in the form of a flat plate;
- each element overconnector has a rectangular contour;
- each segment connector extends over a height substantially equal to the height of the corresponding mast element;
- for at least one mast element, the mast element comprises, at each junction between circumferentially adjacent wall segments, at least two segment connectors that are adjacent along the longitudinal direction and one segment overconnector, which extends astride the two adjacent segment connectors;
- each segment overconnector has a symmetrical outer contour relative to a horizontal plane passing midway, in the longitudinal direction, between the two adjacent segment connectors;
- the longitudinal edges of each segment overconnector coincide with the longitudinal edges of the underlying segment connector;
- each segment overconnector is in the form of a flat plate;
- each segment overconnector has a rectangular contour;
- each wall segment comprises at least one central panel and two side panels forming an angle with the or each central panel, the side panels comprising the longitudinal edges of the wall segment;
- the mast section further comprises third connectors, arranged astride two adjacent mast elements, between two circumferentially adjacent element connectors;
- each third connector extends astride two longitudinally adjacent central panels of the two mast elements and each element connector extends astride two circumferentially adjacent side panels of at least one of the two adjacent mast elements;
- the longitudinal edges of a wall segment of the upper mast element are situated in the extension of the longitudinal edges of the adjacent wall segment in the longitudinal direction of the lower mast element;
- each element connector extends astride two circumferentially adjacent side panels of the two adjacent mast elements;
- the adjacent mast elements are angularly offset from one another, and each element connector extends on the one hand astride two circumferentially adjacent side panels of one of the mast elements and on the other hand on the central panel of the other mast element; and
- the mast section has a tubular shape with a polygonal cross-section, each side of this polygon defining a facet of the mast section.

A wind turbine mast is also provided comprising a mast section as previously described.

A method is also provided for assembling a mast section as previously described, comprising:

- providing wall segments and assembling these wall segments to one another via segment connectors so as to form mast elements;
- stacking, along the longitudinal direction, two mast elements and connecting these two mast elements to one another using element connectors; and
- fastening element connectors astride a segment connector and an element connector that are adjacent in the longitudinal direction.

According to specific features of the assembly method, the step for assembling wall segments comprises, for at least one mast element, connecting circumferentially adjacent wall segments to one another by means of at least two segment connectors that are adjacent in the longitudinal direction, and the assembly method further comprises fastening segment overconnectors, each segment overconnector extending astride the two segment connectors that are adjacent in the longitudinal direction.

BRIEF SUMMARY OF THE DRAWINGS

The invention will be better understood upon reading the following description, provided solely as an example and done in reference to the appended drawings, in which.

DETAILED DESCRIPTION

Throughout the description, "connection" refers to mechanical fastening by a connecting member, and in particular fastening by bolting or screwing. This term in particular therefore does not cover fastening by welding or soldering.

The use of bolts or screws to produce the connections allows optimal management of the fatigue behavior of the mast section by choosing the locations and density of the bolts or screws based on strength and fatigue endurance imperatives. Furthermore, the absence of welds within the mast section and the wind turbine mast makes it possible to avoid the presence of thermally affected areas, which guarantees homogeneity of the performance of the steels and eliminates the weak spots created by these thermally affected areas.

"Height" refers to the dimension of an element along the longitudinal direction, and "width" refers to the dimension of this element perpendicular to the longitudinal direction.

Throughout the description, "longitudinal edges" of an element refer to the edges of this element extending along the longitudinal direction. "Transverse edges" refer to the edges of this element extending perpendicular to the longitudinal direction.

The terms "top" and "bottom", "below" and "above", and "lower" and "upper" are used relative to the normal orientation of the wind turbine mast 2 on its installation site.

Throughout the description, "angular offset" refers to the rotation of a component element of the mast about the central longitudinal axis L compared to an adjacent element.

Throughout the description, the component elements of the mast, the mast section and the mast elements are preferably made from metal, in particular steel, and more particularly from steel coils or plates.

The mast section 1 for a wind turbine according to an embodiment of the invention is intended to form part of a mast 2 of a wind turbine 3.

Figure 1:
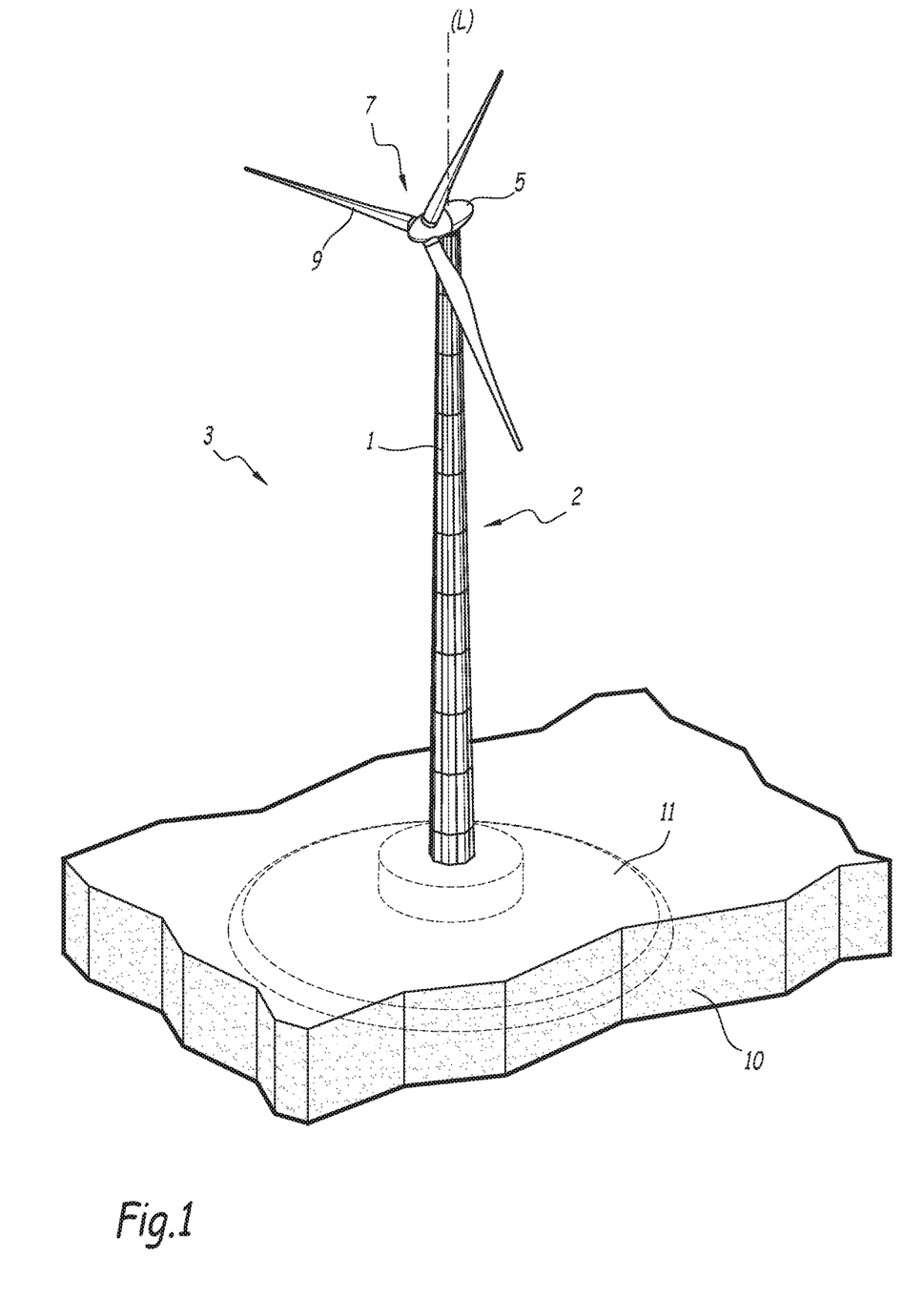
FIG. 1 is a schematic perspective view of a wind turbine.

Conventionally, and as illustrated in FIG. 1, the wind turbine 3 comprises, at its upper end, a nacelle 5 and a rotor 7 mounted on the nacelle 5. The nacelle 5, mounted at the upper end of the mast 2, houses mechanical, electrical and electronic components for the operation of the wind turbine 3. The rotor 7 comprises a plurality of blades 9 intended to be rotated around an axis of the rotor 5 by the energy of the wind. At its lower end, the wind turbine mast 2 is intended to be anchored in the ground 10 of the installation site, by any means known by those skilled in the art, in particular by suitable foundations 11.

The mast section 1 has a tubular shape with a central longitudinal axis L extending in a longitudinal direction. When the mast section 1 is installed on its installation site, the longitudinal direction extends along the vertical of the installation site.

In the examples illustrated in the figures, the mast section 1 has a frustoconical shape, becoming narrower toward the top of the mast 2.

"Cone" refers to any adjusted surface defined by a generatrix passing through an apex and a variable point describing a guide curve.

As an example, the mast section 1 has an outer diameter of about 7 to 11 meters, and for example equal to 9 meters, at its lower end, and about 2 to 4 meters, and for example about 4 meters, at its upper end. These diameters may, however, be adapted based on imperatives related to strength, to the connection to the nacelle or to the installation site.

The mast section 1 preferably has a polygonal cross-section. Each side of this polygon defines a facet of the wall of the mast section 1.

A polygonal frustoconical shape has the advantage of best approaching the frustoconical shape with a circular base, which is the shape with the best wind resistance irrespective of the orientation thereof and the best inertia, while being very easy to manufacture, since it may in particular be made from wall segments obtained by simple bending or profiling of metal sheets.

According to one alternative, the mast section 1 has a cylindrical shape with a polygonal base having a constant cross-section.

Figure 2:
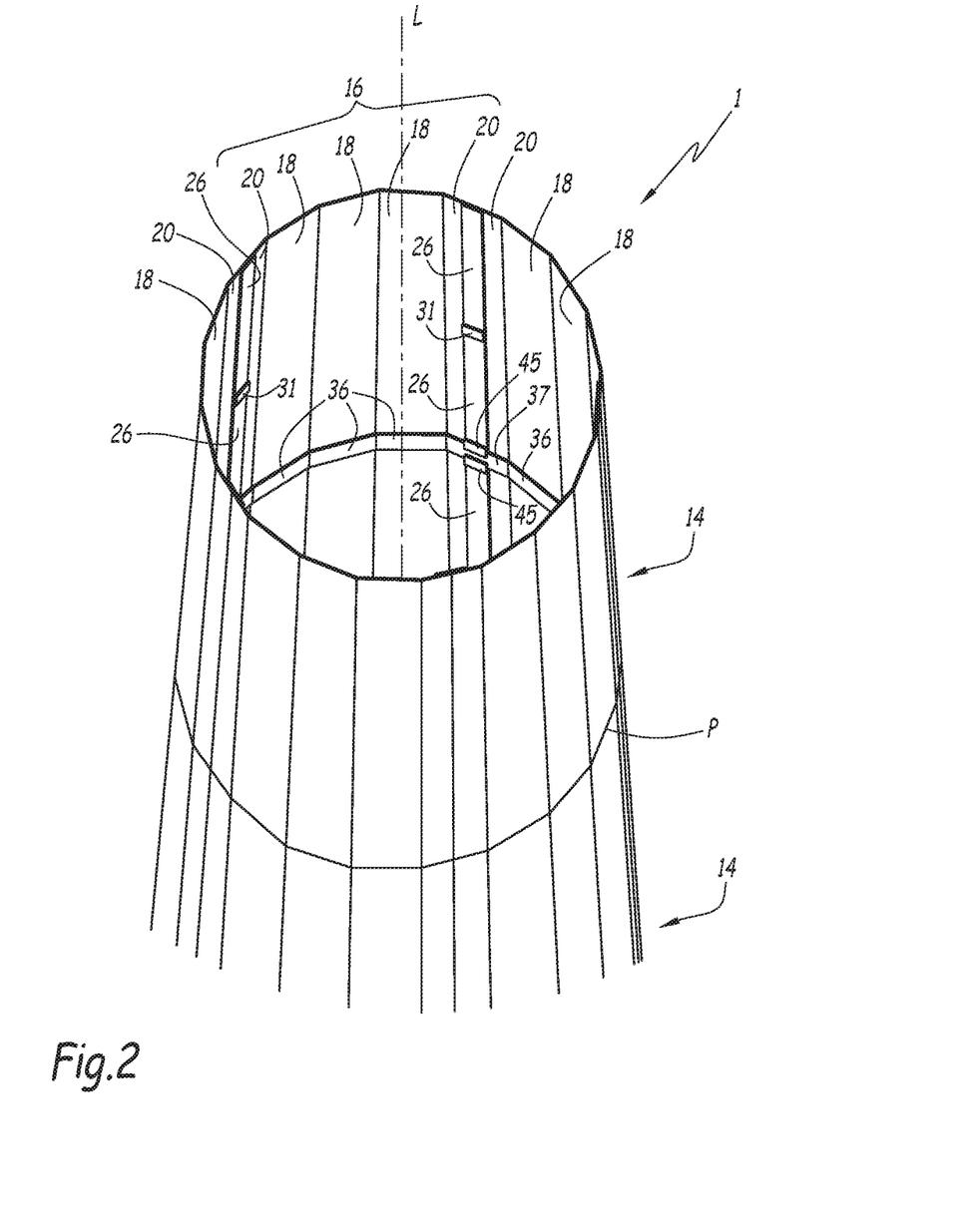
FIG. 2 is a schematic perspective view of part of a wind turbine mast section.

As illustrated in FIG. 2, the mast section 1 comprises at least two mast elements 14, stacked in the longitudinal direction. The adjacent mast elements 14 of the mast section 1 are arranged edge to edge, along a joining plane P, with the play necessary for assembly.

Each mast element 14 has a tubular shape, with a central longitudinal axis coinciding with the central longitudinal axis L of the mast section 1. It has a general shape similar to that of the mast section 1.

In the illustrated examples, the mast element 14 has a frustoconical shape, preferably with a polygonal base, becoming narrower toward the top of the mast element 14.

When the mast section 1 has a cylindrical shape with a polygonal base, the mast element 14 also has a cylindrical shape with a polygonal base.

Each mast element 14 comprises a plurality of wall segments 16 connected to one another by their longitudinal edges. The adjacent wall segments 16 of a mast element 14 are arranged edge to edge, along a joining line, with the play necessary for assembly.

The fact that the mast elements 14 are formed from a plurality of wall segments 16 connected to one another avoids being limited by transport regarding the final diameter of the mast element 14. Indeed, the wall segments 16 are relatively compact and can therefore be transported by standard trucks. They can next be assembled directly on the installation site to obtain mast elements 14 having the desired diameter.

Furthermore, the design based on the assembly of small elements makes it possible to conduct transport with compact and light vehicles, which makes it possible to consider new installation sites that were not possible until now, as they are difficult to access by vehicle for heavy transport vehicles, such as so-called exceptional transport.

For example, the thickness of the wall segments 16 varies as a function of their position along the mast 2, decreasing from the base toward the apex of the mast 2. The wall segments 16 for example have a thickness equal to 30 mm at the base of the mast 2 and 16 mm at the apex of the mast 2.

In the example shown in FIG. 2, each wall segment 16 comprises at least one central panel 18 and two side panels 20. The side panels 20 extend on either side of the central panel 18 along the circumference of the mast element 14. They laterally frame the central panel 18. The side panels 20 comprise the longitudinal edges of the wall segment 16. They each form an angle with the or each central panel 18.

This type of wall segment 16 has the advantage of being easily obtained by simple bending of a metal sheet. The side panels 20 stiffen the wall segments 16 and increase the resistance of said segments 16 to bending in the longitudinal direction.

In the illustrated example, for each illustrated mast element 14, each wall segment 16 comprises several central panels 18, which are adjacent along the circumference of the mast element 14. This set of adjacent central panels 18 is framed by the two side panels 20. More specifically, in this example, for the illustrated mast element 14, each wall segment 16 comprises three central panels 18 and two side panels 20.

According to one embodiment, the wall segments 16 of a given mast element 14 have a number of central panels 18 depending on the position of the mast element in the longitudinal direction. As an example, the number of central panels 18 per wall segment 16 increases from bottom to top along the mast section 1.

The combination of the adjacent side panels 20 of two adjacent wall segments 16 of a mast element 14 forms a facet of the mast element 14. Each central panel 18 of a wall segment 16 also forms a facet of the mast element 14.

Each facet of the associated mast section 1 then corresponds to the combination of the longitudinally adjacent facets of the stacked mast elements 14.

The wall segments 16 are assembled to one another by segment connectors 26 extending along the longitudinal edges of the wall segments 16. The segment connectors 26 are attached to the wall segments 16. Each segment connector 26 extends astride two adjacent wall segments 16 of a mast element 14. It is fastened to the adjacent side panels 20 of two adjacent wall segments 16 of the mast element 14.

Figure 3:
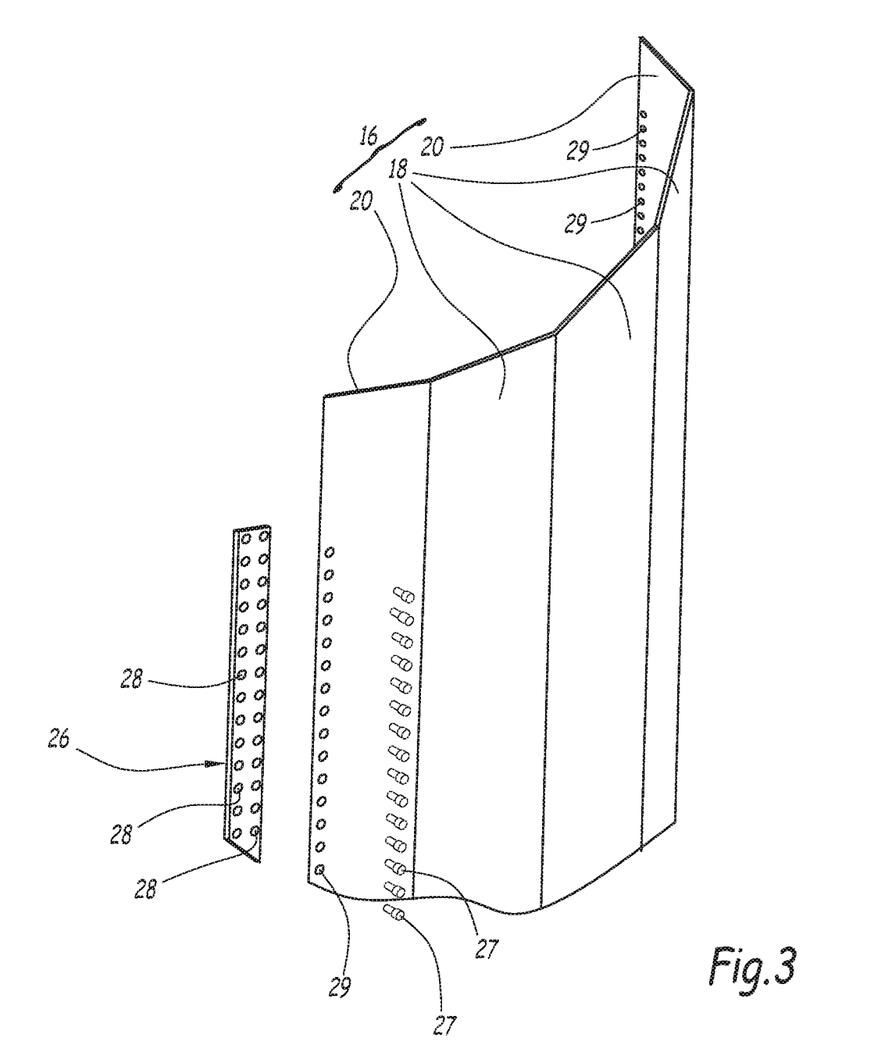
FIG. 3 is an exploded schematic perspective view of part of the wind turbine mast section of FIG. 2.

As illustrated schematically in FIG. 3, each segment connector 26 is fastened to the corresponding wall segments 16 via first connecting members 27, in particular screws or bolts. To that end, the segment connectors 26 comprise connecting orifices 28 intended to receive the first connection members 27. These connecting orifices 28 are organized in the form of a grid comprising rows extending perpendicular to the longitudinal direction, and rows extending parallel to the longitudinal direction.

The wall segments 16 also comprise connection orifices 29 organized in a grid corresponding to that of the connection orifices 28 of the segment connectors 26.

In order to simplify the drawings, the first connection members 27 and the connection orifices 28, 29 are only shown in some of the figures.

The segment connectors 26 are flat. They are advantageously made by simple cutting from a steel sheet.

The segment connectors 26 are arranged inside the mast section 1.

Preferably, the width of the segment connectors 26 is constant over their entire height. In the illustrated examples, each segment connector 26 has a rectangular shape elongated in the longitudinal direction.

As an example, the width of the segment connectors 26 is less than or equal to 40% of the width of the wall facet of the mast element 14 formed by the connection of the side panels 20 of the two wall segments 16 of the mast element 14 using said segment connector 26. More specifically, it is less than or equal to 30% of this width. This width can be adapted for each segment connector 26 of the mast section 1 based on the forces that the segment connector 26 will have to bear.

Preferably, for economic and logistical reasons on the worksite, all of the segment connectors 26 of the mast section 1 have the same width.

In the embodiment shown in FIG. 2, for at least one mast element 14, each segment connector 26 extends over only part of the height of the mast element 14. Thus, at each junction between two adjacent wall segments 16 within the mast element 14, this mast element 14 comprises at least two segment connectors 26, namely a lower segment connector 26 and an upper segment connector 26, which are adjacent in the longitudinal direction. The upper segment connector 26 is arranged in the extension, in the longitudinal direction, of the lower segment connector 26. As an example, the lower and upper segment connectors 26 are arranged edge to edge along a junction line, subject to the necessary play for assembly.

According to one embodiment, the lengths of the lower and upper segment connectors 26 are chosen such that the sum of their lengths is substantially equal to the length of the wall segments 16 that they connect, taken in the longitudinal direction. In this embodiment, each junction between two wall segments 16 within the considered mast element 14 comprises exactly two segment connectors 26.

According to a variant, each junction between two wall segments 16 within the considered mast element 14 comprises more than two segment connectors 26. Preferably, each pair of longitudinally adjacent segment connectors 26 is arranged edge to edge along a junction line, subject to the necessary play for assembly.

Figure 4:
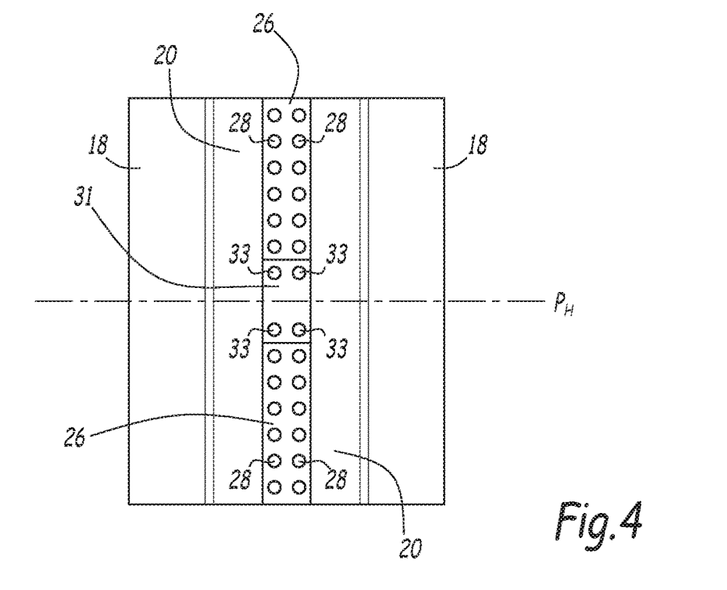
FIG. 4 is an enlarged schematic view of a joining area between two mast elements of a mast section according to an embodiment of the invention, from the inside of the mast.

As illustrated more specifically in FIGS. 2 and 4, the mast section 1 can further comprise segment overconnectors 31.

Within a considered mast element 14, and as shown in particular in FIGS. 2 and 4, each segment overconnector 31 is arranged astride two segment connectors 26, namely a lower segment connector 26 and an upper segment connector 26, which are adjacent in the longitudinal direction.

More specifically, each segment overconnector 31 is attached to the segment connectors 26 at the inner surfaces of the segment connectors 26. It extends in surface contact with the inner surfaces of the underlying segment connectors 26. The outer surfaces of the segment connectors 26 are in contact with the corresponding wall segments 16.

As an example, the outer contour of each segment overconnector 31 is symmetrical relative to the horizontal plane $P_H$ extending midway between the lower segment connector 26 and the upper segment connector 26, and more particularly through the junction line between the lower segment connector 26 and the upper segment connector 26.

In other words, the segment overconnector 31 is symmetrical relative to this horizontal plane regarding its general shape. Conversely, due to the possible differences in distance between the lines and/or rows of connecting orifices of adjacent segment connectors 26, the lines of connecting orifices of the segment overconnector 31 may not be symmetrical relative to this horizontal plane.

According to one embodiment, each segment overconnector 31 is symmetrical relative to the horizontal plane $P_H$ extending midway between the lower segment connector 26 and the upper segment connector 26, and more particularly through the junction line between the lower segment connector 26 and the upper segment connector 26.

The segment overconnectors 31 are flat. They are advantageously made by simple cutting from a steel sheet.

The segment overconnectors 31 have a plate shape. In the illustrated example, they have a rectangular contour.

Preferably, the width of each segment overconnector 31, taken perpendicular to the longitudinal direction, is greater than or equal to 70% of the width of the segment connector 26.

In the illustrated example, the segment overconnector 31 has a width substantially equal to the width of the lower and upper segment connectors 26 that it straddles. In this example, the longitudinal edges of the segment overconnector 31 substantially coincide with the longitudinal edges of the underlying segment connectors 26.

Preferably, the length of each segment overconnector 31, taken in the longitudinal direction, is greater than or equal to 2% of the height of the corresponding mast element 14. It is in particular less than or equal to 8% of the height of the corresponding mast element 14.

Advantageously, each segment overconnector 31 comprises lines of connecting orifices 33, provided to fasten the segment overconnector 31 to the segment connectors 26. Each line of connecting orifices 33 extends substantially perpendicular to the longitudinal direction.

Advantageously, the connecting orifices 33 of the segment overconnectors 31 are arranged such that they coincide with connecting orifices 28 of the underlying segment connectors 26.

The segment overconnectors 31 are fastened on the underlying segment connectors 26 by means of the connecting members 27 previously described, these connecting members 27 being inserted through the coinciding connecting orifices 28, 33 of the segment overconnectors 31 and segment connectors 26.

The segment overconnector 31 preferably comprises an even number of lines of connecting orifices 33 and comprises the same number of lines of connecting orifices 33 facing each segment connector 26, that is to say, on either side of the junction line between the lower and upper segment connectors 26.

In the illustrated example, the segment overconnector 31 comprises exactly two lines of connecting orifices 33, the connecting orifices 33 of the lower line of connecting orifices 33 facing connecting orifices 28 of the lower segment connector 26 and the connecting orifices 33 of the upper line of connecting orifices 33 facing connecting orifices 28 of the upper segment connector 26.

In a variant, the segment overconnector 31 can comprise more than two lines of connecting orifices 33.

As an example, the segment overconnector 31 also comprises an even number of rows of connecting orifices, said rows extending in the longitudinal direction. In the illustrated example, the segment overconnector 31 comprises exactly two rows of connecting orifices.

Preferably, the mast section 1 comprises an overconnector 31 at each junction between two segment connectors 26 that are juxtaposed in the longitudinal direction.

In the example shown in the figures, the segment connectors 26 each extend over only part of the height of the mast element 14 and each mast element 14 comprises several segment connectors 26 that are adjacent in the longitudinal direction.

According to a variant, each segment connector 26 extends over the entire height of the corresponding mast element 14. In this case, the corresponding mast element 14 does not comprise segment overconnectors 31.

The choice of the number of segment connectors 26 per mast element 14 depends on the height of said mast elements 14, the number of segment connectors 26 per mast element 14 in particular increasing with the height of the mast element 14.

The mast section 1 further comprises means for connecting two mast elements 14 that are adjacent in the longitudinal direction to one another.

These connection means comprise element connectors 37, each extending astride two adjacent mast elements 14 in the longitudinal direction, in the longitudinal extension of a respective element connector 26.

The element connectors 37 are arranged inside the mast section 1.

Figure 5:
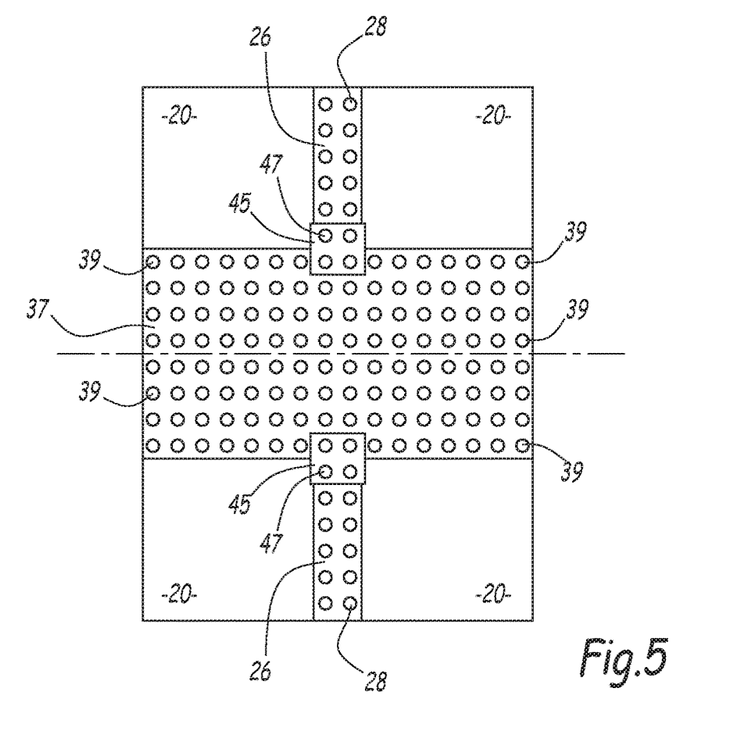
FIG. 5 is an enlarged schematic view of a joining area between two mast elements of a mast section according to an embodiment of the invention, from the inside of the mast.

FIGS. 2 and 5 more specifically illustrate examples of element connectors 37 according to an embodiment of the invention.

The element connectors 37 are flat. They are advantageously made by simple cutting from a steel sheet.

In the illustrated embodiment, the width of the element connectors 37, taken perpendicular to the longitudinal direction, is constant over the entire height of the connectors 37, taken in the longitudinal direction. Each element connector 37 has, in the illustrated examples, a rectangular shape elongated in a direction perpendicular to the longitudinal direction.

In the case of a mast section 1 having facets, each element connector 37 extends over a facet of the mast section 1, astride the longitudinally adjacent facets of the mast elements 14 connected to one another by this element connector 37.

The element connectors 37 have a width smaller than or equal to the width of the wall facet of the mast section 1 on which they are fastened, taken at the joining plane P between these two mast elements 14. Advantageously, the element connectors 37 have a width greater than or equal to 70% of the width of this wall facet, and more specifically 85% of this width. In the embodiment shown in the figures, the element connectors 37 have a width substantially equal to the width of the wall facet of the mast section 1 on which they are fastened.

In the example shown in FIG. 5, the element connectors 37 are symmetrical relative to the joining plane P between the mast elements 14 that they straddle.

Advantageously, each element connector 37 is arranged edge to edge with a segment connector 26 along a junction line subject to the play necessary for assembly.

The element connectors 37 are fastened on the mast elements 14 using second connection members, for example formed by screws or bolts.

As an example, each element connector 37 comprises a regular grid of connecting orifices 39 configured to receive the second connecting members, this grid comprising rows extending perpendicular to the longitudinal direction, and rows extending parallel to the longitudinal direction.

This grid is for example a grid with a rectangular mesh, and for example a square mesh. The connection orifices 39 are distributed regularly over the entire surface of the element connectors 37.

The distance between adjacent connection orifices 39 is chosen so as to optimize the mechanical strength and the fatigue endurance based on the needs and geometric criteria established by the standards in force.

The mast segments 16 also comprise a grid of connection orifices coinciding with the grid of connection orifices 39 of the element connectors 37.

Within the segment connectors 26 and/or element connectors 37, the distances between the lines of connecting orifices 28, 39, formed perpendicular to the longitudinal direction and/or between the rows of connecting orifices 28, 39, formed parallel to the longitudinal direction, are chosen so as to optimize the number of bolts necessary as a function of the mechanical constraints.

As an example, the distance between the lines of connecting orifices 28 of the segment connectors 26 is different from the distance between the lines of connecting orifices 39 of the element connectors 37.

In the embodiment shown in the figures, the distances between the rows of connecting orifices 28, formed parallel to the longitudinal direction, of the segment connectors 26 and between the rows of connecting orifices 39, formed parallel to the longitudinal direction, of the element connectors 37 are identical such that within a mast section 1, the rows of first connecting members 27 extend in the extension of rows of second connecting members 31.

In order to simplify the drawings, the second connection members and the connection orifices are only shown in some of the figures.

In the illustrated embodiment of the invention, the mast section 1 further comprises element overconnectors 45, arranged astride a segment connector 26 and an element connector 37 that are longitudinally adjacent.

More specifically, each element overconnector 45 is attached on the connectors 26, 37 at the inner surfaces of these connectors 26, 37. It extends in surface contact with the inner surfaces of the underlying connectors 26, 37. The outer surfaces of the connectors 26, 37 are in contact with the corresponding wall segments 16.

The element overconnectors 45 are flat. They are advantageously made by simple cutting from a steel sheet.

The element overconnectors 45 have a plate shape. In the illustrated example, they have a rectangular contour.

Each element overconnector has a height 45, taken in the longitudinal direction, greater than or equal to 2% of the height of the corresponding mast element 14. It is in particular less than or equal to 8% of the height of the corresponding mast element 14.

Each element over connector 45 has a width, taken perpendicular to the longitudinal direction, greater than or equal to 70% of the width of the underlying segment connector 26. In the illustrated example, each element overconnector 45 has a width substantially equal to the width of the segment connector 26 that it straddles. In this example, the longitudinal edges of each element overconnector 45 substantially coincide with the longitudinal edges of the underlying segment connector 26.

The element overconnectors 45 thus have a structure and shape that are substantially identical to those of the segment overconnectors 31.

The outer contour of each element overconnector 45 is advantageously symmetrical relative to a horizontal plane passing midway between the underlying segment connector 26 and element connector 37, and more specifically passing through the junction line between these two connectors 26, 37.

In other words, the element overconnector 45 is symmetrical relative to this horizontal plane regarding its general shape. Conversely, in light of the possible differences in distance between the lines and/or rows of connecting orifices of segment connectors 26 and those of the element connectors 37, the lines of connecting orifices of the element overconnector 45 may not be symmetrical relative to this horizontal plane.

Advantageously, each element overconnector 45 comprises lines of connecting orifices 47, provided to fasten the element overconnector 45 to the underlying connectors 26, 37. Advantageously, the connecting orifices 47 of the element overconnectors 45 are arranged such that they coincide with connecting orifices 28, 39 of the underlying connectors 26, 37.

The element overconnectors 45 are fastened on the underlying connectors 26, 37 by means of connecting members connecting these connectors 26, 37 to the corresponding wall segments 16, these connecting members being inserted through the coinciding connecting orifices of the element overconnector 31 and underlying connectors 26, 37.

The element overconnector 45 preferably comprises an even number of lines of connecting orifices 47 and comprises the same number of lines of connecting orifices 47 facing the connectors 26, 37, that is to say, on either side of the junction line between the connectors 26, 37.

Each line of connecting orifices 47 extends perpendicular to the longitudinal direction.

In the illustrated example, the element overconnector 45 comprises exactly two lines of connecting orifices 47, the connecting orifices 47 of the lower line of connecting orifices 47 facing connecting orifices 39 of the element connector 37 and the connecting orifices 47 of the upper line of connecting orifices 47 facing connecting orifices 28 of the segment connector 26.

For example, the element overconnector 45 further comprises an even number of rows of connecting orifices 47, each row of connecting orifices 47 extending in the longitudinal direction. More specifically, in the illustrated example, the element overconnector 45 comprises exactly two rows of connecting orifices 47.

Preferably, the mast section 1 comprises an element overconnector 45 at each junction between a segment connector 26 and an element connector 37.

As illustrated in FIG. 2, the means for connecting mast elements 14 to one another may further comprise intermediate connectors 36. The intermediate connectors 36 connect mast elements 14 to one another at central panels 18 of their wall segments 16. They extend astride the two adjacent mast elements 14 while being fastened on the central panels 18 of the wall segments 16 of these mast elements 14. They are arranged between two circumferentially adjacent element connectors 37. They extend along transverse edges of the mast elements 14.

The intermediate connectors 36 are arranged inside the mast section 1.

The intermediate connectors 36 are substantially planar. In the illustrated example, they have a rectangular contour. They extend in an elongation direction substantially perpendicular to the longitudinal direction.

The intermediate connectors 36 have a width smaller than or equal to the width of the wall facet of the mast section 1 on which they are fastened, taken at the joining plane P between these mast elements 14. This wall facet is formed by the combination of the central panels 20 of the two longitudinally adjacent wall segments 16. As an example, the intermediate connectors 36 have a width larger than or equal to 50% of the width of this wall facet, taken at the joining plane P between these mast elements 14.

The intermediate connectors 36 participate in the rigidity strength along the mast 2, and more particularly between two adjacent mast elements 14.

The intermediate connectors 36 are fastened on the wall segments 16 via third connecting members, such as screws or bolts. Each intermediate connector 36 comprises a regular grid of connection orifices intended to receive the third connection members. This grid is for example a grid with a rectangular mesh, and for example a square mesh. The connection orifices are distributed regularly over the entire surface of the intermediate connectors. The distance between adjacent connection orifices is chosen so as to optimize the mechanical strength and the fatigue endurance based on the needs.

When the mast section 1 comprises intermediate connectors 36, the mast sections 16 also comprise a grid of connection orifices coinciding with the grid of connection orifices of the intermediate connectors.

In order to simplify the drawings, the third connection members and the corresponding connection orifices are not shown in the figures.

A method for assembling a mast section 1 as previously described is also provided.

This assembly method comprises:
  providing wall segments 16 and assembling these wall segments 16 to one another via segment connectors 26 so as to form mast elements 14;
  stacking, along the longitudinal direction, two mast elements 14 and connecting these two mast elements 14 to one another using element connectors 37; and
  fastening element overconnectors 45, each element overconnector 45 being fastened astride a segment connector 26 and an element connector 37 that are longitudinally adjacent.

Optionally, in the case where a given mast element 14 comprises several segment connectors 26 that are adjacent in the longitudinal direction, the assembly method further comprises a step for fastening segment overconnectors 31, each segment overconnector 31 being fastened astride two longitudinally adjacent segment connectors 26.

Optionally, during the stacking step, the two mast elements 14 are further connected using intermediate connectors 36, these intermediate connectors preferably being arranged astride two longitudinally adjacent central panels 18 of the wall segments 16 of the two mast elements 14.

A wind turbine mast 2 comprising at least one mast section 1 as previously described is also provided. Advantageously, the wind turbine mast 2 is formed by stacking, in the longitudinal direction, of such mast sections 1.

The longitudinal edges of a wall segment 16 of the upper mast element 14 are situated in the extension of the longitudinal edges of the adjacent wall segment 16 of the lower mast element 14. Thus, the side panels 20 of the upper mast element 14 are in the extension, in the longitudinal direction, of the side panels 20 of the lower mast element 14 and the central panels 18 of the upper mast element 14 are in the extension, in the longitudinal direction, of the central panels 18 of the lower mast element 14. In this example, each element connector 37 extends astride the side panels 20 of four adjacent wall segments 16.

A mast section 1 according to one variant of the embodiment shown in the figures differs from the mast section shown in the figures only in that the longitudinally adjacent mast elements 14 are angularly offset relative to one another such that the longitudinal edges of a wall segment 16 of the upper mast element 14 are not in the extension of the longitudinal edges of the longitudinally adjacent wall segment 16 of the lower mast element 14. In other words, the joining lines between circumferentially adjacent wall segments 16 of the upper mast element 14 are angularly offset relative to the joining lines between circumferentially adjacent wall segments 16 of the lower mast element 14. They do not extend in the extension of one another in the longitudinal direction.

According to this variant, at least one central panel 18 of a wall segment 16 of the upper mast element 14 extends facing, in the longitudinal direction, two adjacent side panels 20 of the lower mast element 14.

Thus, the segment connectors 26 of the upper mast element 14 are angularly offset relative to the segment connectors 26 of the lower mast element 14. They do not extend in the extension of one another.

In this variant, due to the angular offset between the adjacent mast elements 14, each element connector 37 is in contact, with the play necessary for assembly, with a single segment connector 26. Furthermore, it extends astride three wall segments 16, and not four like in the preceding embodiment.

Such an angular offset of the mast elements 14 improves the mechanical strength of the mast section 1 and the mast 2 due to the fact that the joining lines between wall segments 16 of the adjacent mast elements 14, embodied by the segment connectors 26, are not arranged facing one another in the longitudinal direction. Indeed, the mechanically weakest areas are thus better distributed along the circumference of the mast section 1, which further improves the mechanical strength of the wind turbine mast 2.

The segment overconnectors 31 and the element overconnectors 45 according to this variant are identical to those described with reference to the figures.

The inventors have observed, unexpectedly, that the implementation of overconnectors 31, 45 as described above, extending astride the junctions between segment connectors 26 and element connectors 37 or between adjacent segment connectors 26, significantly improved the distribution of the forces within the mast section 1 and the wind turbine mast 2. The implementation of such overconnectors 31, 45 thus improves the static and dynamic resistance of the mast section 1 and the wind turbine mast 2, allowing a more homogeneous distribution of the stresses in the parts of the mast elements 14 that are located around the connection zones.

In particular, in the absence of such overconnectors, the inventors have observed the appearance of stress concentration zones around the segment connectors 26 and element connectors 37. Yet the inventors have observed that the implementation of the overconnectors 31, 45 as described hereinabove makes it possible to prevent or limit the appearance of these stress concentration zones without it being necessary to increase the thickness of the wall segments 16.

The inventors of the present invention have performed digital simulations, during which they compared the distribution of the forces in a wind turbine mast section provided with element overconnectors 45 as illustrated in FIG. 2 with five comparative mast sections respectively illustrated in FIGS. 6 to 10 and described hereinafter.

The comparative mast sections 1 do not comprise overconnectors.

As illustrated in FIGS. 6 to 10, in all of the comparative mast sections 1, the segment connectors 26 have a substantially rectangular shape.

Each of the element connectors 37 is symmetrical relative to the joining plane between adjacent mast elements 14.

Figure 6:
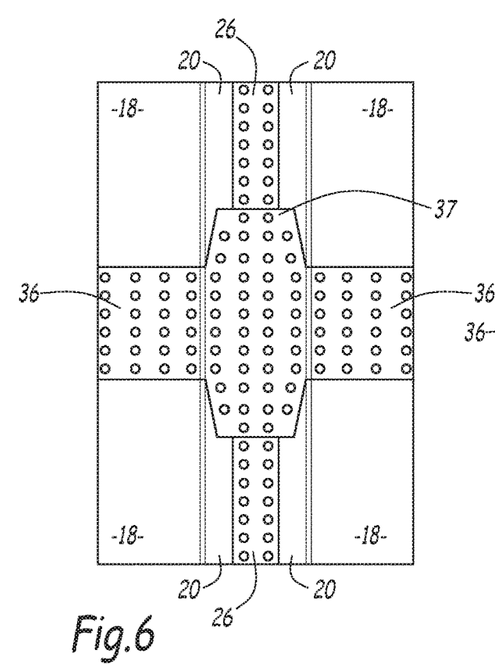
FIGS. 6 to 10 illustrate junction zones between mast elements, from the inside of the mast, according to comparative examples.

More specifically, as illustrated in FIG. 6, in the first comparative mast section 1, each element connector 37 has an octagonal contour. In this example, the width of the element connectors 37 varies, toward each of the adjacent segment connectors 26, from a width substantially equal to that of the facet of the mast element 14 on which the element connector 37 is fastened up to a width substantially equal to that of the adjacent segment connectors 26.

Figure 7:
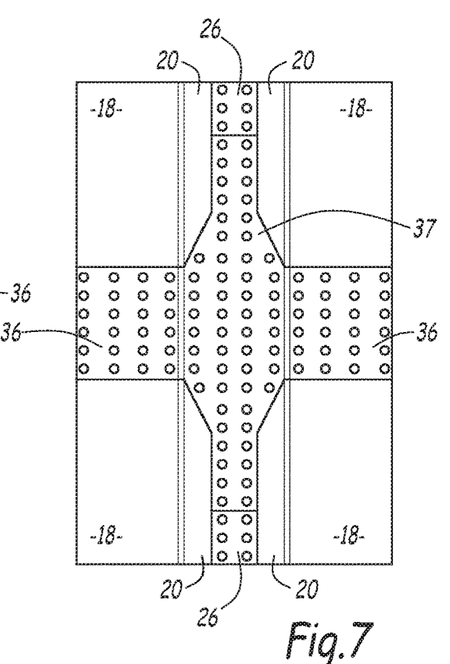

In the second comparative mast section 1, illustrated in FIG. 7, each element connector 37 has a central part of orthogonal contour, arranged astride the junction line between the two adjacent mast elements 14 and extended longitudinally, at each of its longitudinal ends, by an end part of rectangular contour. The width of the central part varies, toward its longitudinal ends, from a width substantially equal to that of the facet of the mast element 14 on which the element connector 37 is fastened up to a width substantially equal to that of the segment connectors 26. The part of rectangular contour has a width substantially equal to that of the segment connectors 26.

Figure 8:
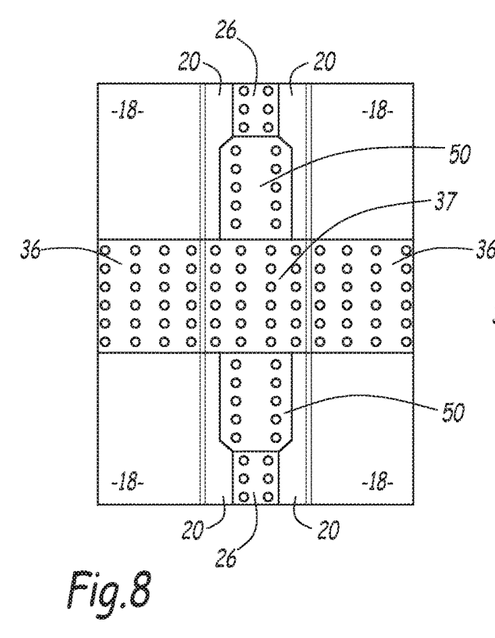

In the third comparative mast section 1, illustrated in FIG. 8, each element connector 37 has a rectangular shape of width substantially equal to that of the facet of the mast element 14 on which the element connector 37 is fastened. Additionally, an intermediate connector 50 is inserted between the segment connector 26 and the element connector 37. The intermediate connector 50 has a width substantially equal to that of the segment connector 26 at its junction with the segment connector 26. The width of the intermediate connector 50 increases from the segment connector 26 toward the element connector 37.

Figure 9:
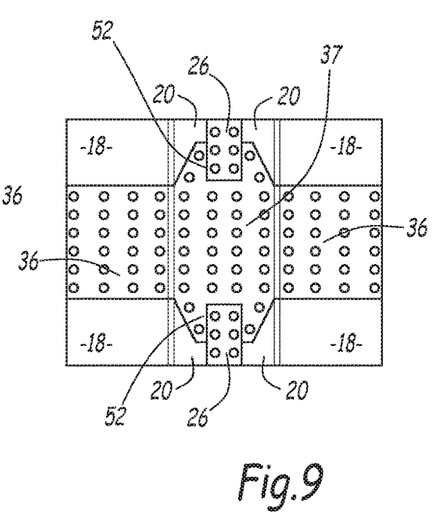

In the fourth comparative mast section 1, illustrated in FIG. 9, each element connector 37 has an octagonal contour similar to that of the element connectors 37 of the first comparative mast section 1, but comprises, at each of its longitudinal ends, an indentation 52 having a shape complementary to that of the segment connector 26, in which a corresponding end of the segment connector 26 is received.

Figure 10:
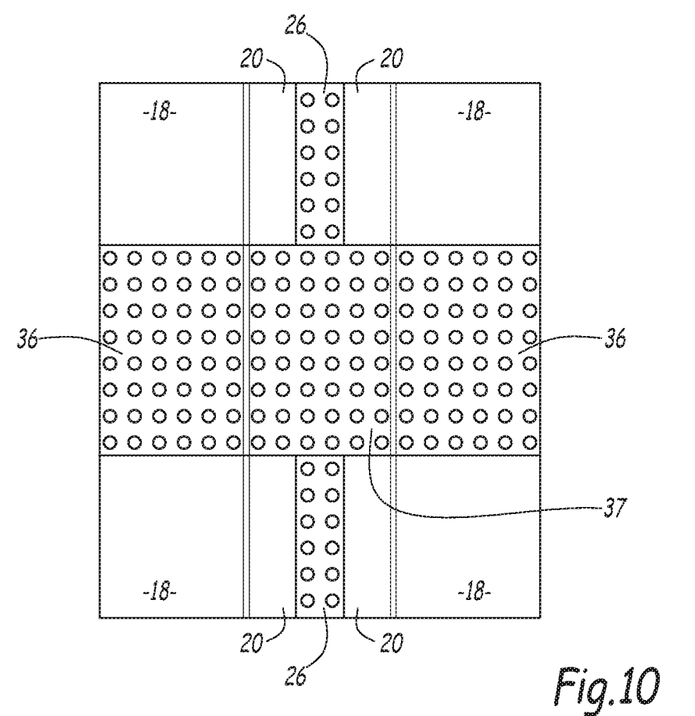

In the fifth comparative mast section 1, illustrated in FIG. 10, the segment 26 and element 37 connectors have shapes identical to those of the segment 26 and element 37 connectors according to the embodiment of the invention illustrated in FIG. 2, but the mast section 1 does not comprise overconnectors.

More specifically, the inventors have determined, for each type of mast section 1, values of an eccentricity factor, defined as being the ratio between the effective value of the Von Mises stress around the bolted connections and the nominal value of the Von Mises stress according to the shell theory. The effective value of the stress around the bolted connections being greater than or equal to the nominal stress, the eccentricity factor is always greater than or equal to 1.

This eccentricity factor is representative of the impact of each configuration on the distribution of the stresses in the mast section 1.

More specifically, for each type of analyzed mast section 1, taking the hypothesis of a mast section 1 made up of eleven mast elements 14, the inventors have calculated the value of this eccentricity factor at the connection between the wall segments of the tenth and eleventh mast element 14, the first mast element 14 being located at the ground, on either side of the junction between these mast elements 14.

The results of these calculations are provided in table 1 below.

TABLE 1

| Mast section | Mast element 11 | Mast element 10 |
|---|---|---|
| Embodiment of the Invention | 1.45 | 1.48 |
| Comparative example 1 | 2.80 | 2.49 |
| Comparative example 2 | 2.97 | 2.86 |
| Comparative example 3 | 3.01 | 3.09 |
| Comparative example 4 | 2.09 | 2.13 |
| Comparative example 5 | 2.82 | 2.75 |

As shown by the table above, the configuration according to the embodiment of the present invention is that which makes it possible to obtain the lowest eccentricity factors.

Thus, the configuration according to the embodiment of the present invention results in a reduction of the stresses related to the effects of the eccentricities that appear through additional and localized contributions coming from the bending moment, in particular in the region between the segment connectors 26 and the element connectors 37.

These simulations therefore show that the solution proposed by the embodiment of the present invention, and consisting of adding overconnectors astride the segment connectors 26 and the element connectors 37, is that which allows, among the six simulated configurations, the best distribution of the stresses within the mast.

What is claimed is:

1. A mast section for a wind turbine having a longitudinal central axis extending along a longitudinal direction, the mast section comprising:
    at least two tubular mast elements stacked along the longitudinal direction and arranged edge-to-edge at a joining plane, each tubular mast element comprising at least two wall segments connected to one another by segment connectors extending along longitudinal edges of the wall segments;
    element connectors each extending astride the at least two tubular mast elements each element connector extending a corresponding one of the segment connectors in the longitudinal direction; and
    a plurality of element overconnectors, each element overconnector extending astride one of the segment connectors and extending astride an adjacent one of the element connectors in the longitudinal direction.

2. The mast section according to claim 1, wherein each element overconnector has a symmetrical outer contour relative to a horizontal plane passing, in the longitudinal direction, midway between the one segment connector and the adjacent element connector.

3. The mast section according to claim 1, wherein longitudinal edges of each element overconnector coincide with longitudinal edges of an underlying one of the segment connectors.

4. The mast section according to claim 1, wherein each element overconnector is a flat plate.

5. The mast section according to claim 1, wherein each element overconnector has a rectangular contour.

6. The mast section according to claim 1, wherein each segment connector extends over a height substantially equal to a height of the corresponding tubular mast element.

7. The mast section according to claim 1, wherein, at least one of the at least two tubular mast elements comprises, at each junction between circumferentially adjacent wall segments of the tubular mast element, at least two of the segment connectors that are adjacent along the longitudinal direction and one segment overconnector, which extends astride the two adjacent segment connectors.

8. The mast section according to claim 7, wherein each segment overconnector has a symmetrical outer contour relative to a horizontal plane passing midway, in the longitudinal direction, between the two adjacent segment connectors.

9. The mast section according to claim 7, wherein longitudinal edges of each segment overconnector coincide with longitudinal edges of an underlying one of the segment connectors.

10. The mast section according to claim 7, wherein each segment overconnector is in the form of a flat plate.

11. The mast section according to claim 7, wherein each segment overconnector has a rectangular contour.

12. The mast section according to claim 1, wherein each wall segment comprises at least one central panel and two side panels forming an angle with the at least one central panel, the side panels comprising the longitudinal edges of the wall segment.

13. The mast section according to claim 12, further comprising intermediate connectors, each arranged astride two adjacent tubular mast elements of the mast tubular elements, between two circumferentially adjacent element connectors of the element connectors.

14. The mast section according to claim 13, wherein each intermediate connector extends astride two longitudinally adjacent central panels of the central panels of the two adjacent tubular mast elements, the two longitudinally adjacent central panels including one of the at least one central panels of each of the two adjacent tubular mast element, each element connector extends astride two circumferentially adjacent side panels of the side panels of at least one of the two adjacent tubular mast elements.

15. The mast section according to claim 12, wherein the at least two tubular mast elements include an upper mast element and a lower mast element, longitudinal edges of one of the wall segments of the upper mast element being situated in an extension of longitudinal edges of the adjacent wall segment in the longitudinal direction of the lower mast element.

16. The mast section according to claim 15, wherein each element connector extends astride two circumferentially adjacent side panels of the side panels of the two adjacent mast elements.

17. The mast section according to claim 12, wherein the adjacent mast elements are angularly offset from one another, and each element connector extends on the one hand astride two circumferentially adjacent side panels of the side panels of one of the mast elements and on the other hand on the at least one central panel of the other mast element.

18. The mast section according to claim 1, wherein the mast section has a tubular shape with a polygonal cross-section, each side of a polygon defining the polygonal cross-section defining a facet of the mast section.

19. A wind turbine mast comprising at least one mast section according to claim 1.

20. The mast section according to claim 1, wherein the segment connectors overlap adjacent wall segments of a tubular mast element.

21. The mast section according to claim 1, wherein the element connector and the element overconnector form two separate parts.

22. The mast section according to claim 1, wherein the segment connectors and two adjacent wall segments are separate parts.

23. A method for assembling the mast section according to claim 1, comprising:
providing the wall segments and assembling the wall segments to one another via the segment connectors so as to form the tubular mast elements;
stacking, along the longitudinal direction, the tubular mast elements and connecting the tubular mast elements to one another using the element connectors; and
fastening the plurality of element overconnectors such that each element overconnector extends astride one of the segment connectors and one of the element connectors that are adjacent in the longitudinal direction.

24. The assembly method according to claim 23, wherein the assembling of the wall segments comprises, for at least one of mast elements, connecting circumferentially adjacent wall segments to one another by means of at least two of the segment connectors that are adjacent in the longitudinal direction, the assembly method further comprising fastening segment overconnectors, each segment overconnector extending astride the two segment connectors that are adjacent in the longitudinal direction.

* * * * *